United States Patent
Rothwell et al.

(10) Patent No.: US 9,076,141 B2
(45) Date of Patent: *Jul. 7, 2015

(54) TRANSACTION APPARATUS, SYSTEMS AND METHODS

(71) Applicant: Eagle Eye Solutions Limited, Surrey (GB)

(72) Inventors: Stephen Rothwell, Surrey (GB); Edward James Pippin, Surrey (GB)

(73) Assignee: EAGLE EYE SOLUTIONS LIMITED, Surrey (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/153,693

(22) Filed: Jan. 13, 2014

(65) Prior Publication Data

US 2014/0124574 A1    May 8, 2014

Related U.S. Application Data

(63) Continuation of application No. 13/708,228, filed on Dec. 7, 2012, now Pat. No. 8,636,206, which is a continuation of application No. 12/050,024, filed on Mar. 17, 2008, now Pat. No. 8,353,451, which is a
(Continued)

(30) Foreign Application Priority Data

Sep. 16, 2005    (GB) .................................. 0518963.4

(51) Int. Cl.
*G06K 5/00*    (2006.01)
*G06Q 20/34*    (2012.01)
(Continued)

(52) U.S. Cl.
CPC ................ *G06Q 20/34* (2013.01); *G06Q 20/20* (2013.01); *G06Q 20/40* (2013.01); *G06Q 30/02* (2013.01); *G07F 7/10* (2013.01); *G07G 1/12* (2013.01); *G06Q 20/204* (2013.01)

(58) Field of Classification Search
CPC .......... G06F 7/08; G06F 7/082; G06F 7/0833
USPC .................. 235/375, 379, 380, 382, 383
See application file for complete search history.

(56) References Cited

U.S. PATENT DOCUMENTS 5,128,520 A    7/1992    Rando
5,256,863 A    10/1993    Ferguson
(Continued)

FOREIGN PATENT DOCUMENTS

AU    2003236476        3/2004
EP    1077437 A2       2/2001
(Continued)

OTHER PUBLICATIONS

International Search Report dated Dec. 27, 2006 for International Patent Application No. PCT/GB2006/003441.
(Continued)

*Primary Examiner* — Daniel St Cyr
(74) *Attorney, Agent, or Firm* — EIP US LLP

(57) ABSTRACT

Aspects and embodiments of the present invention relate to alternative kinds of transactions, which do not involve payment using only cash or a token device such as a smart card or chip and PIN card. In some embodiments, transactions involve a customer providing token-less transaction authentication information using customer interface means (150) that is adapted to receive, from a customer, in a first mode of operation, PIN or other token device authentication information, for use in a token device transaction, and token-less transaction authentication information, when operating in another mode of operation. In some embodiments, the customer interface means may be a specially-adapted chip and PIN card reader apparatus. Accordingly, such a customer input means facilitates manual input by a customer of voucher, coupon, accrued loyalty points, Air Miles, ticket or pass authentication information, without the need for a retailer to install new equipment or IT infrastructure.

20 Claims, 10 Drawing Sheets

Related U.S. Application Data continuation of application No. PCT/GB2006/003441, filed on Sep. 15, 2006.

(60) Provisional application No. 60/718,470, filed on Sep. 19, 2005.

(51) Int. Cl.
*G06Q 20/20* (2012.01)
*G06Q 20/40* (2012.01)
*G06Q 30/02* (2012.01)
*G07F 7/10* (2006.01)
*G07G 1/12* (2006.01)

(56) References Cited

U.S. PATENT DOCUMENTS

| | | | |
|---|---|---|---|
| 5,412,191 A | 5/1995 | Baitz | |
| 5,809,143 A | 9/1998 | Hughes | |
| 6,225,982 B1 | 5/2001 | Vassigh | |
| 6,325,285 B1 | 12/2001 | Baratelli | |
| 6,852,031 B1 | 2/2005 | Rowe | |
| 8,353,451 B2* | 1/2013 | Rothwell et al. | 235/380 |
| 8,636,206 B2* | 1/2014 | Rothwell et al. | 235/380 |
| 2002/0082925 A1 | 6/2002 | Herwig | |
| 2002/0099608 A1* | 7/2002 | Pons et al. | 705/21 |
| 2002/0123965 A1 | 9/2002 | Phillips | |
| 2002/0174067 A1 | 11/2002 | Hoffman | |
| 2003/0061172 A1 | 3/2003 | Robinson | |
| 2003/0078793 A1 | 4/2003 | Toth | |
| 2004/0017135 A1 | 1/2004 | Roberts | |
| 2004/0023483 A1 | 2/2004 | Tsuchiya | |
| 2004/0188516 A1 | 9/2004 | De Myttennaere | |
| 2004/0250037 A1 | 12/2004 | Takemura | |
| 2005/0109836 A1 | 5/2005 | Ben-Aissa | |
| 2005/0187843 A1 | 8/2005 | Lapsley | |

FOREIGN PATENT DOCUMENTS

| | | |
|---|---|---|
| EP | 1564667 A1 | 8/2005 |
| EP | 1736947 A1 | 12/2006 |
| JP | 56123059 A | 9/1981 |
| NZ | 505372 | 8/2002 |
| WO | 2005008446 A2 | 1/2005 |
| WO | 2005084398 A2 | 9/2005 |
| WO | 2006058039 A2 | 6/2006 |

OTHER PUBLICATIONS

International Preliminary Report on Patentability dated Mar. 27, 2008 for International Patent Application No. PCT/GB2006/003441.

* cited by examiner

TRANSACTION APPARATUS, SYSTEMS AND METHODS

CROSS-REFERENCE TO RELATED APPLICATIONS

This application is a continuation of U.S. patent application Ser. No. 13/708,228, filed on Dec. 7, 2012 (now U.S. Pat. No. 8,636,206), which is a continuation of U.S. patent application Ser. No. 12/050,024, filed on Mar. 17, 2008 (now U.S. Pat. No. 8,353,451), which is continuation under 35 U.S.C. §120 of International Application Number PCT/GB2006/003441, filed on Sep. 15, 2006 under the Patent Cooperation Treaty (PCT), which was published by the International Bureau in English on Mar. 22, 2007 with International Publication Number WO/2007/031776, which designates the United States and claims the benefit of both (1) GB Application No. 0518963.4, filed Sep. 16, 2005, and (2) U.S. Provisional Patent Application No. 60/718,470, filed on Sep. 19, 2005. Each of the above-referenced patent applications is hereby incorporated by reference in its entirety.

BACKGROUND OF THE INVENTION

1. Field of the Invention

The present invention relates to transactions and particularly, but not exclusively, to apparatus for use in transactions involving token devices, for example chip and PIN payment cards, and for use in token-less transactions, and to systems and methods involving use of such apparatus.

2. Description of the Related Technology

Card transactions are well known and typically comprise a customer using a credit card, debit card, store card, charge card or the like to buy a product or service either in person or remotely, for example over the telephone or using the Internet.

Originally, credit, debit, store and charge cards, which will hereafter be referred to generally herein as "payment cards", or simply "cards", were used by a vendor taking a payment card from a customer and making an imprint of the card details, which were provided in relief on the front side of the card. The customer would then countersign the imprint and the vendor would compare the countersignature with a copy of the account holder's signature, represented on the back side of the card, in order authenticate the transaction.

A significant development in payment card technology came with the introduction of cards carrying magnetic stripes containing information about an account holder and a respective account from where funds can be drawn to honor a transaction carried out using the card. Such cards are still in common use today. The vendor typically takes the card from the customer and 'swipes' the card through a magnetic card reader that reads the data from the magnetic stripe. The magnetic card reader typically interacts with a cash register or an electronic point of sale (EPOS) terminal and transmits the information to a remote transaction server associated with the card issuing institution, for example a bank or credit card company. A customer using this kind of payment card is still required to sign an equivalent to a counterfoil of a transaction in order to authenticate the transaction, whereafter the vendor of the product or service compares the signature supplied with a representation of the account holder's signature, which is on the back of the payment card.

The introduction of payment cards carrying a magnetic stripe was a huge step in the cashless transaction industry. A significant benefit was that payment cards could be checked in real time to see if they had been stolen, thereby greatly reducing the opportunity for card fraud. However, on the down side, all retailers and card issuing institutions had to install a brand new information technology infrastructure for reading the cards and managing the transactions. More recently, there has been a second significant change in payment card technology, with a move towards so-called 'chip and PIN' payment cards, having an embedded semiconductor device, or "chip".

The chip includes memory that is programmed, before issue to the account holder, with personal information, respective account information and a personal identification number (PIN). The chip incorporates an embedded program for facilitating secure data read, write and comparison operations. The card also provides an interface for coupling the chip with an appropriate chip and PIN card interface apparatus, which is still commonly referred to as a card "reader", even though the apparatus is not merely a reader: rather, it has the ability to send data to, and receive data from, or, more generally, to interact with, a chip and PIN card. Accordingly, references herein to a chip and PIN card 'reader', or the like, should be taken to mean a device or apparatus that can interact with a chip and PIN card, or the like, at least by transmitting data to and receiving data from the card. Commonly, a chip and PIN card comprises a number of physical pads, or connectors, which are arranged on a surface of the card to make contact with corresponding pads or connectors in a card reader, when the card is physically inserted into the reader.

A typical card reader comprises a slot for receiving a chip and PIN card, a numeric keypad, also known as a TIN pad', which is used by customers for entering a PIN, and a display for providing visual prompts and progress feedback to customers. A significant difference between a transaction using either an imprint or a magnetic stripe card and a transaction using a chip and PIN card is that, in the latter case, the customer physically interacts with the card reader by entering a PIN while the card is inserted in the card reader. In principle, it is not necessary in a chip and PIN card transaction for the vendor to handle the card at all, which reduces the chance that a vendor can misappropriate any card information.

A chip and PIN card reader can be a standalone device, which can connect directly to the systems of financial institutions, or it may be connected to an EPOS terminal, which initiates or controls the operation of the reader, hi the latter case, for example, the vendor interacts with the EPOS terminal to 'prime' the card reader and the customer interacts with the chip and PIN card reader to enter their PIN. Known chip and PIN card readers can be connected to an EPOS terminal using an interface cable, via a wireless communications link, or can be connected directly to financial institutions via a dial-up connection, wireless link or other network access point.

In an exemplary, known chip and PIN card transaction in which the chip and PIN card reader is connected to an EPOS terminal, a vendor enters the details of a desired transaction into an EPOS terminal and selects payment using a chip and PIN card. In response, the card reader displays a prompt for the customer to insert their chip and PIN card into the card reader. When the card reader receives a card, it usually displays a message asking the customer to enter their PIN using the keypad (although there can be an extra step asking the customer to confirm the type of payment that they want to make, for example a credit card payment or a debit card payment). The customer uses the keypad to enter the PIN, the card reader captures the PIN and transmits it to the chip and PIN card. The chip and PIN card compares the received PIN with the stored PIN. The chip and PIN card only permits a transaction to proceed if the received PIN matches the stored PBSf. If the received PEST matches the stored PIN, the card reader or EPOS terminal communicates (where possible, although a certain number of consecutive offline transactions may be allowed on each card), with a transaction server of a card issuing institution, at which the respective customer account is held. If the institution authorizes the transaction, a corresponding message is transmitted to the chip and PIN card reader, an authorization message is sent to the EPOS terminal, the transaction completes and, at some future point in time (or sometimes almost immediately), funds are transferred from the card issuing institution to the vendor.

As yet, not all vendors support chip and PIN card transactions. However, chip and PIN cards are being heavily promoted by card issuing institutions as a way of reducing payment card fraud. Soon, it is believed, most payment card transactions will be chip and PBSf card transactions. As such, chip and PIN card readers will reside in most, if not all, sales establishments. Before being usable in a practical environment, all new chip and PIN card and card reader technology must pass highly stringent compliance testing, to ensure that the products fully comply with required operational and high security specifications. Such specifications include those produced and published by EMVCo LLC.

As with the move to magnetic stripe payment cards, the move to chip and PIN payment cards has required an additional huge investment hi new infrastructure by vendors and card issuing institutions alike. It will be appreciated that such an investment can only be justified with sufficient support from card holders, vendors, and card issuing institutions.

SUMMARY OF CERTAIN INVENTIVE ASPECTS

In a first embodiment, a transaction apparatus is provided. The transaction apparatus comprises a token device interface arrangement; a customer input device; and a communications network configured to communicate with one or more transaction servers, the transaction servers configured to enact at least two different kinds of transactions. The apparatus is configured to operate selectively according to a first mode, to receive token device authentication information from a customer via the customer input device, to transmit the authentication information to an authentication processor, and to receive from the authentication processor a validation signal, in order to validate a transaction involving payment using a customer-provided token device; and according to a second mode, to receive token-less transaction authentication information from a customer via the customer input device, to facilitate a transaction, without involving a customer-provided token device in the validation of the transaction authentication information.

In a second embodiment, a transaction system comprises a transaction server configured to store information relating to token-less transactions, a transaction apparatus as described immediately above, and means for enabling completion of token-less transactions between the transaction server and the transaction apparatus.

In a third embodiment, a method of enacting a token-less customer transaction by interacting with a transaction apparatus is provided. The method includes inputting, into a customer input device of the apparatus, token-less transaction authentication information for identifying a token-less transaction, wherein the customer input device is adapted also to receive, via the customer input device and when operating in a different mode, token device authentication information relating to authentication of a customer-provided token device, for use in authenticating the token device and validating a transaction involving payment using the token device; communicating at least some of the information to a token-less transaction server in order to verify the token-less transaction; verifying the token-less transaction; and completing the token-less transaction.

BRIEF DESCRIPTION OF THE DRAWINGS

Embodiments of the present invention will now be described by way of example only with reference to the accompanying drawings, of which.

DETAILED DESCRIPTION OF THE CERTAIN INVENTIVE EMBODIMENTS

Figure 1:
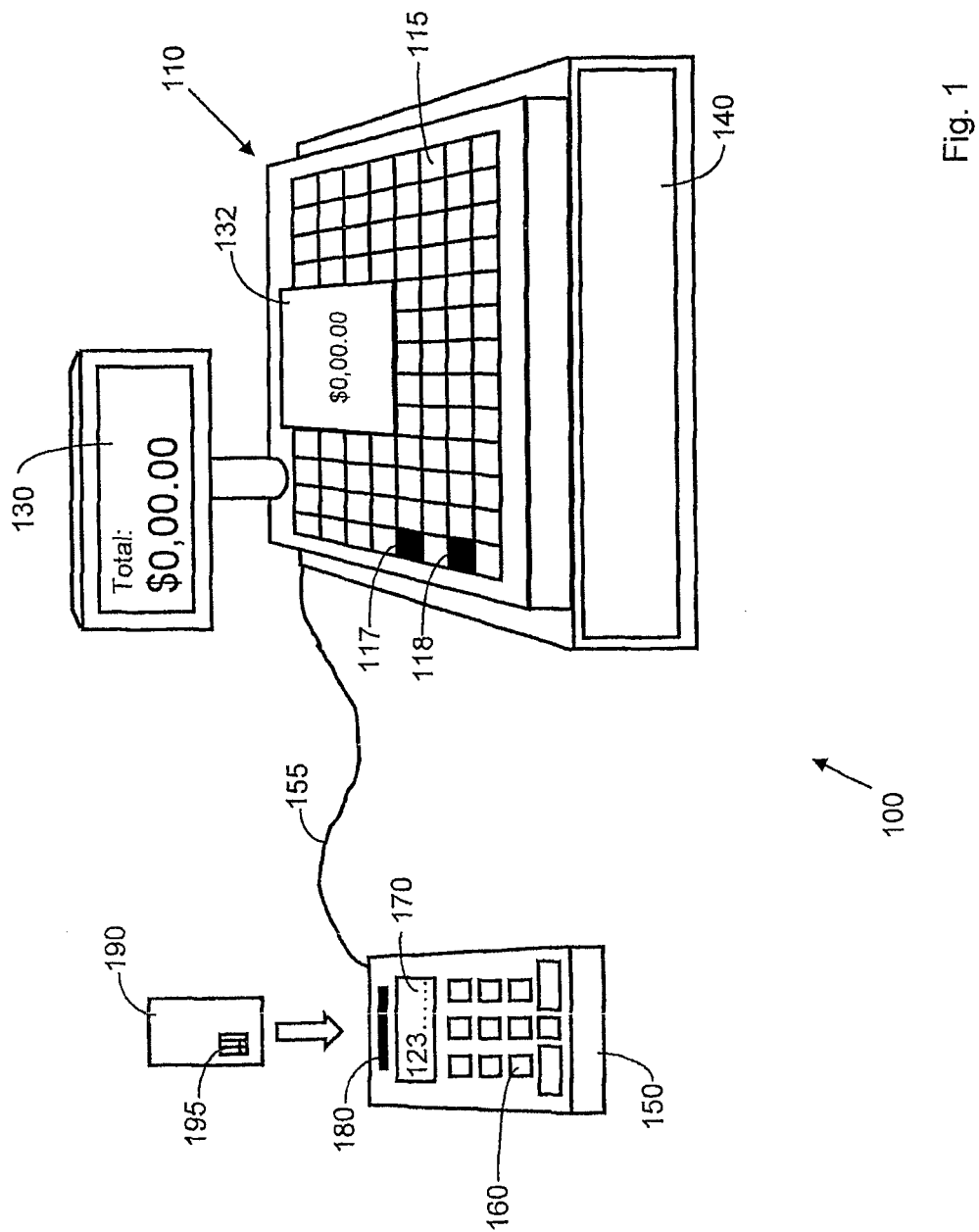
FIG. 1 is a diagram showing an exemplary EPOS system including an EPOS terminal and a chip and PIN card reader.

Embodiments of the present invention aim to support new kinds of cashless transaction with reduced need, or no need, for additional significant investment hi new information technology infrastructure. The present inventors have appreciated that increasing numbers of retail and other sales outlets possess a chip and PIN card reader, or, more generally, a token device interface, which is currently adapted for the sole purpose of facilitating chip and PIN card transactions or the like. Embodiments of the present invention take advantage of the expected pervasiveness of such chip and PIN card readers by adapting the readers for use in other kinds of transactions, for example token-less transactions, as will be described in detail hereinafter. Some embodiments of the present invention relate to a chip and PIN card reader that can be used in token-less transactions, which do not involve a chip and PIN card, but do take advantage of the user input keypad provided by such chip and PIN readers. Accordingly, such new kinds of token-less transactions can be implemented without requiring vendors or card issuing institutions to invest in any new physical information technology infrastructure.

Token-less transactions do not involve a token device, and attendant customer authentication thereof. Such transactions include those in which a monetary value is redeemed against the purchase or acquisition of a product, a service, a ticket or the like. A token-less transaction is different from payment, using cash or a payment card such as a credit card, a debit card, a store card, a charge card or the like, since, in a token-less transaction, with respect to a redeemable value at least, there is likely to be no transfer of money from a customer to a vendor. In some cases, money may be paid by a third party in advance of a token-less transaction, to establish the potential for the transaction to take place, or money may be paid by a third party after a token-less transaction takes place, to settle the transaction (though, the third party would typically have promised to settle the transaction with the vendor in advance of it taking place). In other cases, a vendor may provide an option for a token-less transaction to take place in future, for example, on the basis of a current transaction and/or previous transactions. In either event, a token-less transaction is typically enabled by a person or party that wishes the customer to derive, and be able to redeem, a monetary value. For example, the third party may be a friend of the customer, who wishes to impart a gift to the customer, or a commercial organization, which wishes to encourage the customer to buy something in future.

One kind of token-less transaction referred to herein involves redeeming a value associated with a voucher, wherein the value is used to pay for, or contribute towards, the purchase of a product, a service, a ticket or the like. As already alluded to, the voucher may be a gift from a friend (the aforementioned third party) of the customer. Another exemplary token-less transaction involves redeeming a value associated with accrued loyalty points. In this case, for example, a supermarket, may award loyalty points to the customer for current and past purchases, in order to encourage the customer to shop at the supermarket in future. Yet another tokenless transaction involves redeeming a value associated with a coupon. The coupon may be provided by a product manufacturer (a third party), which issues coupons that can be used in various retail environments. In any event, the redeemable value may be an absolute monetary equivalent value or the value (whatever that may be) associated with a particular product or service. The value may be a full amount payable, a contribution towards a full amount payable, a discount (absolute value or percentage) from a full amount, or a multi-buy offer, for example, "buy one, get one free". Other ways of representing a redeemable value are possible and will become evident to the skilled person from reading the following description.

According to a first aspect, the present invention provides transaction apparatus comprising a token device interface arrangement; customer input means; and communications means, for communicating with one or more transaction servers, for enacting different kinds of transactions, wherein the apparatus is arranged to operate selectively according to a first mode, to receive token device authentication information from a customer, via the customer input means, transmit the authentication information to an authentication means, and receive therefrom a validation signal, in order to validate a transaction involving payment using a customer-provided token device; and according to a second mode, to receive token-less transaction authentication information from a customer, via the customer input means, to facilitate a transaction, without involving a customer-provided token device in the validation of the transaction authentication information.

The term 'token device' is used herein to encompass the broad category of portable processing devices, including SMART cards, adapted for use in cashless transactions, wherein a customer can only use the token if they can authenticate their use thereof, for example by providing a PIN or other authentication information. While chip and PIN payment cards clearly fall within this category, there are other kinds of payment card already in use or potentially usable in future. For example, payment cards might contain in addition to, or instead of, a PIN5 biometric information of the cardholder. Such biometric information might be finger print information, iris information, or any other kind of appropriate biometric information, of the cardholder. Then, a respective customer input means, which is associated with a 'token device interface', would typically have the capability to detect a cardholder's iris or finger print information. Alternatively, some kinds of token devices (for example, pre-pay cards which can be 'charged' with differing amounts of funds) may not contain (or be required to provide) on-board authentication information, but, instead, may rely on authentication by another means, for example a remote authentication service or system. Other kinds of token devices may not take the form of a 'card' as such. For example, some token devices may take the form of a key ring fob or, indeed, any other convenient form. In any event, while some token devices may be adapted to interact with a respective interface by contact, others may use proximity communications, for example using contact-less radiofrequency technology, as exemplified by an RFID tag or the like. Some token devices may be powered, for example having on on-board battery power source, whereas others, for example employing passive RFID tag functionality, may rely on radiofrequency energy emitted by a token device interface.

In certain embodiments of the present invention, a chip and PIN card reader, adapted according to the first aspect to include the ability to operate in a tokenless transaction, has the advantage that such token-less transactions can be. facilitated without putting in place an additional transaction infrastructure beyond that which is already in place, for example, for chip and PIN card transactions.

According to a second aspect, the present invention provides a transaction system, comprising a transaction server, storing information relating to token-less transactions, transaction apparatus according to any one of the preceding claims and means for enabling completion of token-less transactions between the transaction server and the transaction apparatus. In some embodiments, the transaction apparatus may include an EPOS terminal and a chip and PIN reader. Such a transaction apparatus may be adapted to operate in an existing infrastructure.

According to a third aspect, the present invention provides a customer transaction method, for enacting a token-less transaction by interacting with a transaction apparatus, comprising the steps of inputting, into a customer input means of the apparatus, token-less transaction authentication information for identifying a token-less transaction, wherein the customer input means is adapted also to receive, via the customer input means and when operating in a different mode, token device authentication information relating to authentication of a customer-provided token device, for use in authenticating the token device and validating a transaction involving payment using the token device; communicating at least some of the information to a token-less transaction server in order to verify the token-less transaction; verifying the token-less transaction; and completing the token-less transaction.

According to one exemplary embodiment, the diagram in FIG. 1 illustrates an EPOS system arrangement 100. Specifically, FIG. 1 illustrates an EPOS terminal 110 and a chip and PIN card reader 150. The chip and PIN card reader 150 is connected to the EPOS terminal 110 via a standard interface cable 155 (although in other instances they could be connected via wireless protocols). The EPOS terminal 110 comprises the usual features of a keyboard 115, a pole display 130, an operator display 132, and a cash drawer 140. The keyboard 115 is standard apart from it having additional keys 117 and 118, programmed for selecting new kinds of transaction, as will be described in detail hereinafter.

The keyboard 115 is for use exclusively by an operator of the system, for example a retail sales assistant, and not by a customer. The chip and PIN card reader 150 comprises the usual features of a keypad 160, which is used by a customer for entering a PIN, a display 170 for providing prompts and progress feedback to the customer and a slot 180, for receiving a chip and PIN card 190. A chip and PIN card 190 is also shown, having a chip 195.

Figure 2:
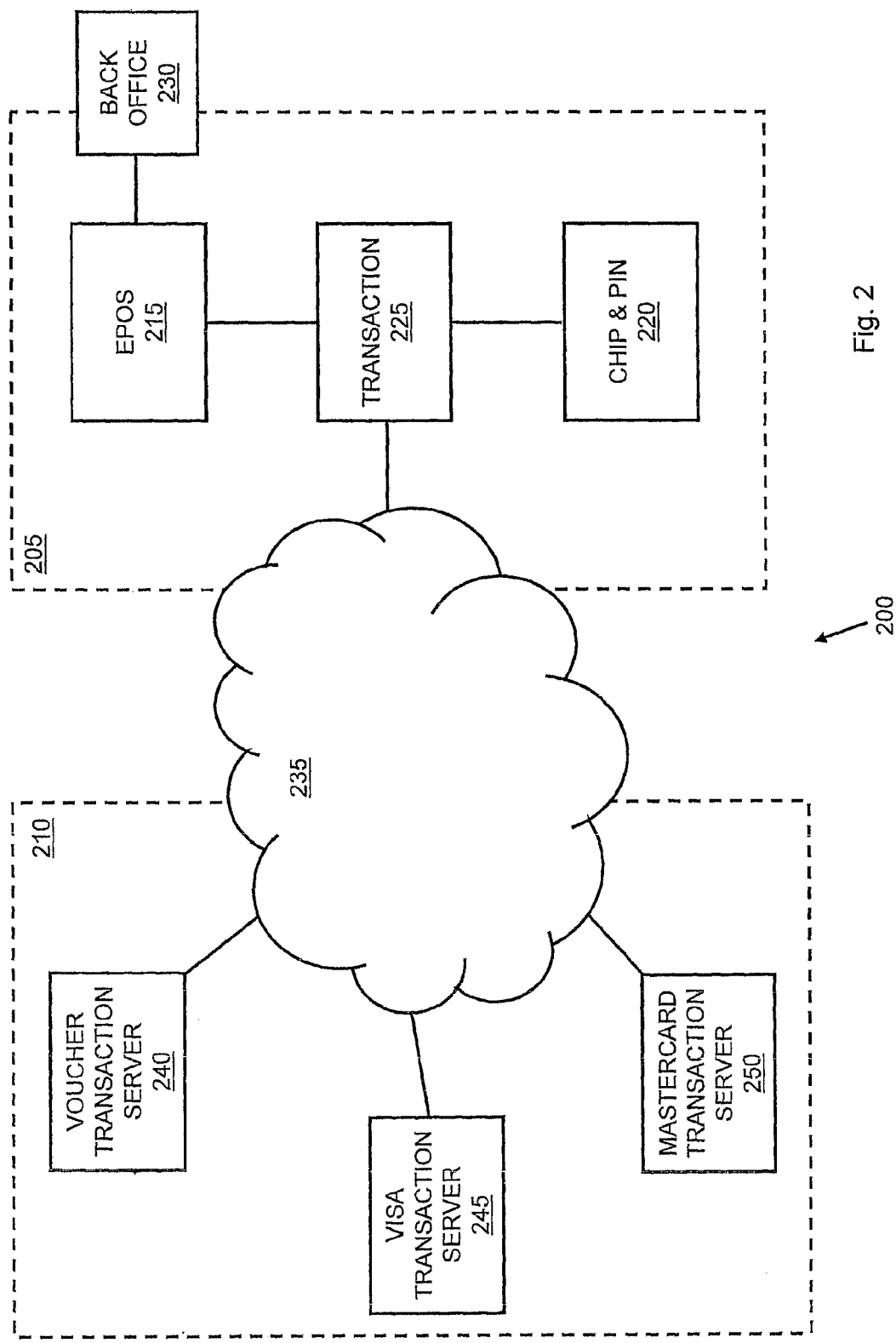
FIG. 2 is a block diagram illustrating a transaction system for redeeming vouchers according to embodiments of the present invention.

The block diagram in FIG. 2 illustrates an exemplary transaction system 200, according to embodiments of the present invention, for use in a transaction involving voucher redemption. The transaction system has a front end 205 and a back end 210. The back end 210 comprises one or more transaction servers, in this example a voucher transaction server (VTS) 240, a VISA™ transaction server 245 and a MasterCard™ transaction server 250. While the services associated with the latter two servers are well known, and are mentioned herein merely in order to assist with understanding, the operation of the VTS 240 will be described in more specific detail hereinafter. The front end 205 and back end 210 communicate with each other via a wide area network 235, for example the Internet.

For the present purposes, the front end 205 of the transaction system 200 comprises three main functional blocks: an EPOS function 215, a chip and PIN card reader function 220 and a transaction function 225. Generally-speaking, these functions control the EPOS terminal and chip and PIN card reader hardware, for example as shown in FIG. 1, and are realized in software, firmware, or an appropriate combination of both. In the context of FIG. 1, the transaction function 225 manages all communications (1) between the EPOS terminal 110 and the chip and PIN card reader 150 and (2) between the chip and PIN card reader 150 and the transaction servers 240, 245 and 250. Additionally, the EPOS function 215 manages the EPOS terminal and the chip and PIN card reader function 220 manages the keypad and the interactions between a chip and PIN card 190 and the chip and PIN card reader 150. It will be appreciated that the functional components that are shown in the front end 205 of FIG. 2 may be distributed in various different ways depending on the exact nature of the hardware in the front end 205, which may vary from that illustrated in FIG. 1.

For example, the chip and PIN functionality 220 may reside mainly on a standalone chip and PIN card reader 150 and the EPOS functionality may reside mainly on an EPOS terminal 110. The transaction functionality 225 may then reside either mainly on the chip and PIN card reader 150 or mainly on the EPOS terminal 110. Alternatively, the chip and PIN card reader 150 may provide a physical enclosure containing an interface for chip and PIN payment cards 190 and a keypad 160, while the bulk of the respective chip and PIN functionality 220 may reside on the EPOS terminal 110. In such a case, the transaction functionality may also reside mainly on the EPOS terminal 110. As another possible alternative, the EPOS terminal 110 and the chip and PIN card reader 150 may comprise an integrated unit and then all functionality may reside on that unit. As a further possible alternative, the chip and PIN card reader functionality 220 may reside on an independent system, separate from both the EPOS terminal and the chip and PIN card reader.

In other embodiments, the chip and PIN card reader may be a standalone, independent unit, which is adapted to be used in token-less transactions according to embodiments of the present invention, and which is arranged to communicate directly with a VTS 240 and/or with other kinds of transaction server. In other words, in such embodiments, an EPOS terminal is not a part of the payment system at all, and payments are handled by the standalone unit, which interacts directly with the VTS (or other transaction servers). Unless otherwise indicated, embodiments of the present invention are described hereafter without reference to where the transaction functionality 225 resides in a physical system.

While the diagram in FIG. 2 shows only one front end 205, in a practical system there are likely to be many, for example tens, hundreds or even thousands of similar front ends attached to a single back end. Additionally, in larger retail environments, it is commonplace for each of plural EPOS terminals (only one of which is shown) to be connected to a back office server 230, which consolidates the transactions of all the EPOS terminals. In such a system, which is sometimes referred to as an integrated point of sale (iPOS) system, at least some of the EPOS functionality may also reside on the back office server 230.

Figure 3:
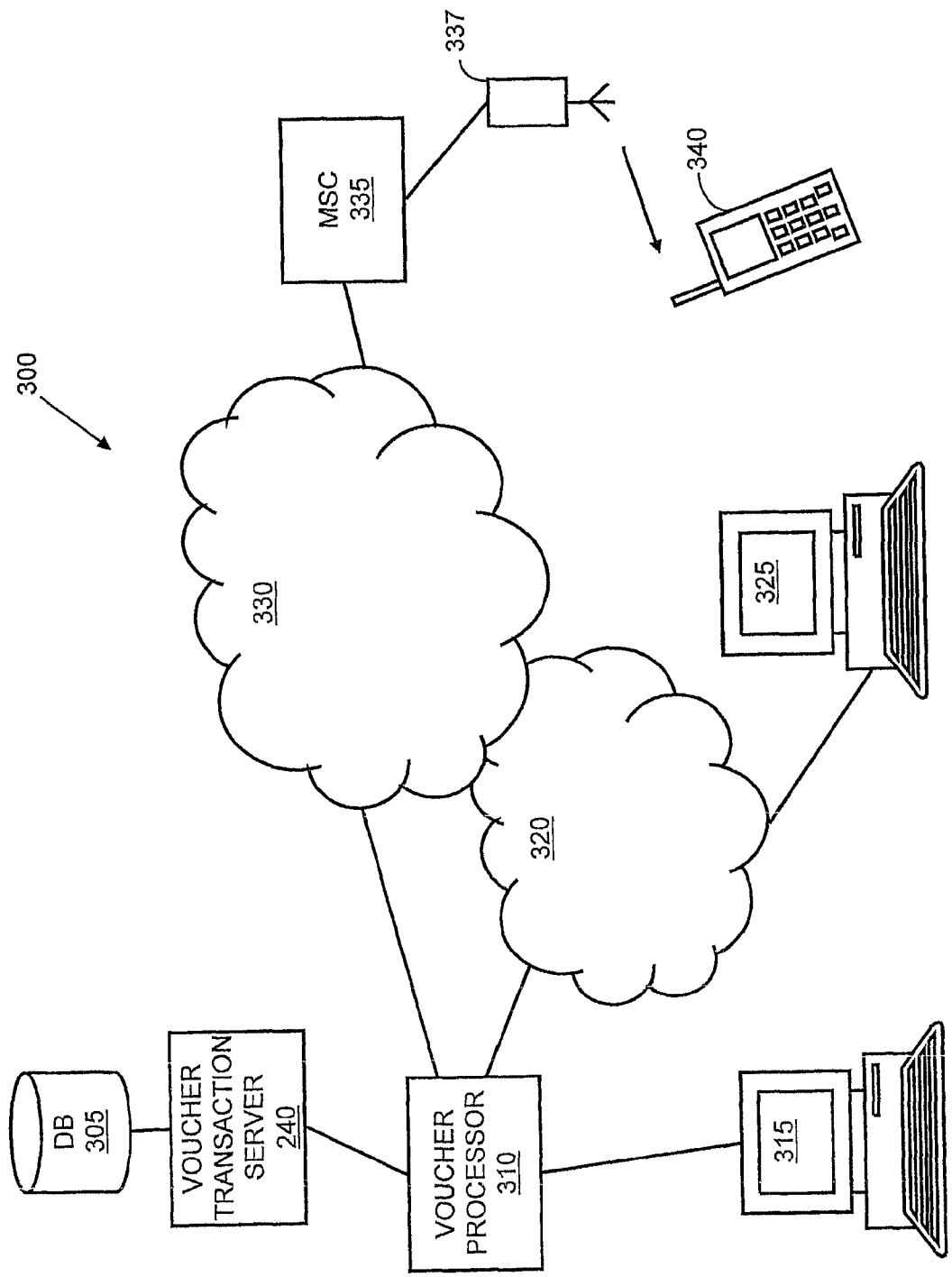
FIG. 3 is a block diagram of a voucher issuing system for use in accordance with embodiments of the present invention.

Of the various token-less transactions that have been mentioned herein, a voucher transaction will now be described. There are two main steps involved in a voucher transaction: a first step is voucher issuance and a second step is voucher redemption. Embodiments of the present invention relate more specifically, although not exclusively, to voucher redemption. However, for completeness, an exemplary voucher issuance system will now be described with reference to the diagram in FIG. 3. As shown in FIG. 3, the system comprises the VTS 240 of FIG. 2, a voucher database 305, for storing a plurality of valid, registered vouchers, and a voucher processor 310, for use in registering and issuing new vouchers. The voucher processor 310 is connected to a local voucher input terminal 315, through which a local operator can register vouchers, and is also accessible, for example via the Internet 320, to users of remote computers 325, for example who wish to purchase a voucher for themselves or for someone else. The voucher processor 310 is also connected via a wide area network 330, which may be the same as or different from network 320, to a mobile switching centre 335 of a mobile telephony network 337, whereby vouchers can be transmitted to a mobile telephone handset 340 of an intended recipient. According to the system in FIG. 3, vouchers can be created and issued in a number of ways, including (but not limited to) the following ways:

(1) Direct Entry.

For example, a voucher may be generated and issued in some way, for example by being printed in a magazine or newspaper. Then the voucher may be redeemed, for example by the purchaser of the magazine or newspaper according to embodiments of the present invention. Using direct entry, an operator registers a requirement for a respective voucher or number of vouchers using the operator terminal 315. The request is forwarded to the voucher processor 310, which is arranged to issue the required voucher or number of vouchers. Each voucher comprises at least a unique voucher identity (ID) code and probably also a voucher creation date and a voucher expiry date. This information, for the or each voucher, is transmitted to the VTS 240, which stores the voucher information in the voucher database 305. The or each voucher ID is also returned by the voucher processor 310 to the voucher input terminal 315, whereby the operator can issue the voucher ID(s) to a respective organization, for example, which will print and distribute the voucher(s) in books or magazines.

It is expected that for vouchers issued by way of being printed in books or magazines, or the like, it might be too burdensome to print a different voucher ID in each copy thereof. Thus it is anticipated that the same voucher ID might be used in all copies, and the voucher ID might then be associated with a multiple use restriction, whereby the same ID can be redeemed a certain number of times on a first come first served basis, or a temporal restriction whereby the voucher ID can be redeemed any number of times within a certain specified period of time, for example within one day or one week.

(2) Remote Entry and Receipt. For example, a person may wish to send a voucher to a friend or colleague. For this, the person logs into the transaction processor 310 using a convenient remote computer 325 and uses a standard secure on-line purchase method to purchase the voucher. The transaction processor 310 in this example handles voucher generation as before and also the financial transaction. The voucher information is transmitted to the VTS 240 and voucher database 305 as in (1). The transaction server finally sends the voucher ID to the person at the remote terminal 325, who can print or write down the information and then send it as a gift to the friend or colleague.

(3) Remote Entry and Delivery. This method is similar to the method described in (2). However, in this case, in addition to purchasing the voucher the person specifies that they wish for the voucher to be sent directly to the intended recipient via a text message or other remote communications mechanism. For the example of a text message, the person supplies the respective telephone number of the intended recipient and, optionally, a greeting message. Accordingly, the transaction processor generates the voucher information, forwards the information to the VTS and then sends the voucher ID, telephone number and greeting message, via the wide area network 330, to the mobile switching centre 335. The mobile switching centre 335, using an appropriate automated process, uses the information to generate a respective text message, containing all the requisite information, and sends or transmits it to mobile telephone handset 340 of the intended recipient via the mobile telephony network 337. Of course, many other voucher issuance processes and methods, known and yet to be conceived of, are possible.

In most cases mentioned, a voucher has an associated value that can be redeemed by a redeemer of the voucher. According to embodiments of the present invention it is expected that a voucher can have a direct monetary value and be redeemable against the whole or at least a part of the value of a transaction. For example, the voucher may be worth ten dollars in any given transaction. Alternatively, the voucher may have an indirect monetary value and specify certain goods or services against which it may be redeemed. For example, the voucher may be redeemable against a bottle of a certain beer in a specified bar or restaurant, a trip, journey or mode of transport, or against the cost of entry into a venue, such as a cinema, theatre or sporting arena. In the latter cases, the voucher, in effect, becomes a travel or entry ticket or pass. In addition, the voucher may have a relative value. For example, the voucher may be worth a certain percentage off a given transaction; in effect, providing a percentage discount. In principle, however, a voucher can have any kind of redeemable value.

Figure 4:
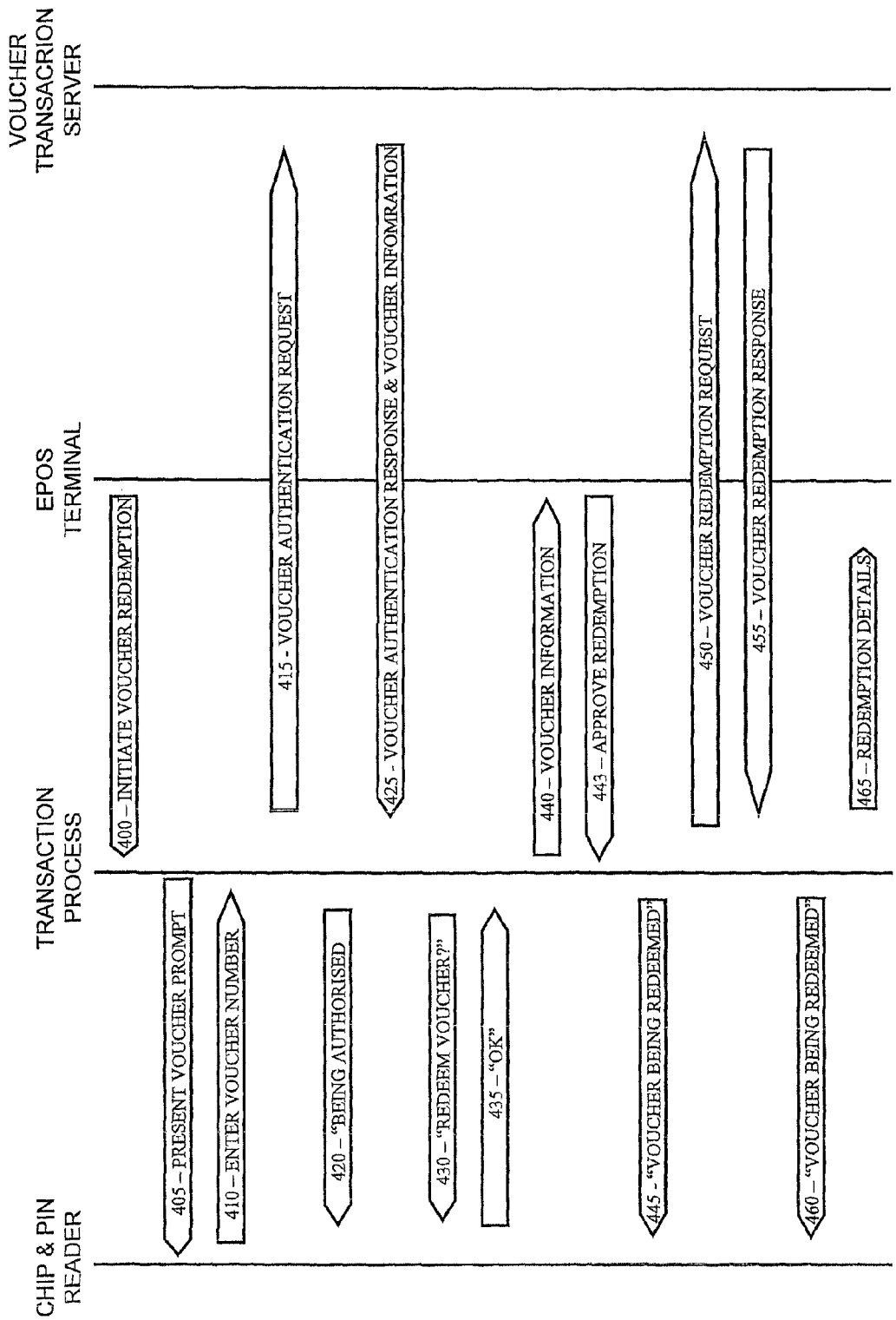
FIG. 4 is a flow diagram illustrating the steps involved in redeeming a voucher in the system of FIG. 2.

An exemplary method of redeeming a voucher against a retail transaction will now be described with reference to the flow diagram in FIG. 4. In this example, a redeemer is a customer in a retail outlet who has a voucher to redeem and the operator of a respective EPOS terminal is a retail sales assistant. The customer interacts directly with a chip and PIN card reader adapted according to embodiments of the present invention in order to redeem the voucher. In step 400, the sales assistant initiates a voucher transaction, by pressing a respective key 117, associated with voucher transactions, on the EPOS terminal 110. This causes the transaction process 225 to put the chip and PHST card reader 150 into 'voucher mode', whereas typically it might by default be hi chip and PIN card reader mode.

In step 405, transaction process 225 causes the chip and PIN card reader 150, which is arranged to face and be near to the customer, to present a prompt to the customer telling them to enter the voucher ID, in this case a number, and press "OK" (or "ENTER", "YES", "CONFIRM", or whatever the affirmative is on the reader). The chip and PIN card reader 150 also has a "CANCEL" key (or "STOP" or whatever the negative response is on the reader) and a clear or delete function for allowing the customer to re-enter the voucher ID, delete the last digit entered or cancel the transaction entirely. In step 410, the customer enters their voucher ID using the keypad 160 on the chip and PIN card reader and presses OK. Alternatively, the customer may not be required to enter "OK" in embodiments, for example, in which the reader automatically accepts the voucher ID on entry of the last digit of the number.

A common feature of embodiments of the present invention herein is that me user is able to enter data via a keypad or other convenient user input device (for example a touch pad). In some instances, the keypad will be an integral part of a chip and PIN reader unit, and the whole unit may be arranged to face, or be handed to, the customer in order that they can enter their information. In other instances, for example, where at least a portion of the chip and PIN reader functionality resides in an integrated EPOS terminal, there is provided a customer-facing display and keypad unit, or other convenient user input device, whereby a customer can enter either a PIN or a voucher (or other token-less transaction) ID, as the situation requires. The user input device is commonly separate from any input devices (for example a keyboard or touch-screen), which face, and are used by, a sales assistant.

In response, in step 415, the transaction process 225 generates a first data packet containing the voucher ID and sends the packet to the VTS 240. The first data packet, for example, includes the voucher ID; a unique transaction ID, generated for the transaction by the transaction process 225; —a redemption location ID, for example a department identity in a retail establishment; a card reader ID, which is unique to the card reader 150; a vendor ID, which is unique to the vendor; and a date and time stamp of the transaction. The transaction process 225 forms the data packet 400 into an appropriate data format, for example using known encryption and error detection and correction data, for example of the kind already used by the chip and PIN card reader in a standard chip and PIN card transaction. AU data packets that are described hereinafter are also formatted in this or a similar appropriate way.

In step 420, the transaction process 225 causes the chip and PIN card reader 150 to display a message indicating that the voucher ID is being authenticated. In step 425, the VTS 240 receives the first data packet, checks the information therein against details of valid vouchers that are stored in the voucher database 305 and, if the voucher ID is found and meets all the authentication criteria that may be associated with the voucher, returns a message indicating that this voucher is valid. The authentication criteria may include checks, for example, whether the voucher has expired or whether the voucher is being used in an appropriate venue. The message is returned to the transaction process 225 by way of a second data packet, for example including the voucher ID; —the transaction ID; a unique VTS ID, generated for the transaction by the VTS 240; a voucher type, for example whether it is a money voucher, a product voucher or a discount voucher, which is extracted from the voucher database 305; a voucher value; a voucher status, for example, whether the voucher is valid or not and an associated reason if it is not valid; a voucher description; an expiry date (if applicable); the date and time stamp; a personalized message, to be displayed by the card reader; and a miscellaneous text field, for example containing other relevant information to be displayed by the chip and PIN card reader or the EPOS terminal, such as "over 18 s only" if the voucher is a product voucher redeemable against an alcoholic beverage.

If a voucher ID is not found in the voucher database 305, then a respective appropriate response is provided instead. In step 430, the transaction process 225 receives the second data packet and, assuming the voucher has been authenticated, causes the chip and PIN card reader to display a message, for example, indicating that the voucher has been authenticated, the personalized message (for example "Happy Birthday"), any miscellaneous text, information about the value and/or kind of voucher and asks the customer to confirm that they wish to redeem voucher. If the voucher has not been authenticated for any reason then the transaction process 225 causes the chip and PIN card reader to display a message stating that the transaction cannot be completed and giving a reason why according to any respective information received in the second data packet.

For an authenticated transaction, in step 435, the customer opts to redeem the voucher by pressing "OK" on the keypad. If they choose not to proceed with the transaction then the cancellation information will be passed to the transaction process 225 and from there to the EPOS terminal 110, where the transaction on the EPOS will be cancelled.

In response, in step 440, the transaction process 225 forwards the voucher information to the EPOS terminal 110 and causes the EPOS terminal to display a message to the sales assistant that the customer wishes to redeem the voucher against the current transaction and that the sales assistant is required to approve the redemption of the voucher against the transaction. The voucher information comprises a third data packet, for example, including the voucher ID; the transaction ID; the VTS ID; the type of voucher; the voucher value; the voucher status; the voucher description; the expiry date (if applicable); the date and time stamp; and the miscellaneous text field.

In step 443, the sales assistant presses the voucher transaction button 117 a second time to approve the transaction. In response, in step 445, the transaction process 225 causes the chip and PIN card reader to display a message stating that the voucher is being redeemed. Furthermore, in step 450, the transaction process 225 sends a request to the VTS 240 confirming that the voucher should be redeemed. The request comprises a fourth data packet, for example, including the voucher ID; the transaction ED; the VTS ID; a redemption confirmation indicator (for example "YES" or "NO"); the redemption location ID; the card reader ID; the vendor ID; and the date and time stamp.

In response, in step 455, the VTS 240 checks that the voucher is still valid and, if it is, generates a redemption authorization ID and returns an authorization confirmed message to the transaction process 225. If authorization is not possible (for any reason) then the VTS 240 will send back to the transaction process 225 a message saying that the transaction cannot be completed. The VTS 240 also updates its voucher database 305 to indicate that the voucher has been redeemed, where the voucher has been redeemed (that is the redemption location, vendor and card reader information) and the redemption date and time stamp. The authorization confirmed message comprises a fifth data packet, for example, including the voucher ID; the transaction ID; the VTS ID; the redemption authorization ID; the voucher type; the voucher value; the date and time stamp. The transaction process 225 receives the confirmation by way of the fifth data packet and, in step 460, causes the chip and PIN card reader to display a message indicating that the voucher has been redeemed and, perhaps also, a thank you message.

In addition, in step 465, the transaction process 225 passes redemption details to the EPOS terminal 110, so that the sales assistant can finalize the transaction, for example, by using the voucher value to reduce or remove the monetary cost to the customer of the transaction, collect any additional money, for example in the form of cash or by using a chip and PIN card transaction, and provide a receipt. The redemption details comprise a sixth data packet, for example, including the voucher ID; the transaction ID; the VTS 240 ID; the redemption authorization ID; the voucher type; the voucher value; and the date and time stamp.

The foregoing process illustrates an exemplary, voucher redemption procedure. Of course, there are many possible variants to such a process; some including more steps and some including fewer steps. Indeed, variants may pass more data fields in each data packet, fewer data fields in each data packet and/or different data fields in each data packet. The amount and kind of data transmitted will be tuned for any particular scenario. For example, a procedure including fewer steps might operate on the basis that the act of the customer entering the voucher ID into the chip and PTN card reader is sufficient to redeem a valid voucher against a respective transaction, without requiring the sales assistant to approve the redemption and/or without requiring the VTS 240 to authenticate the request first. A relatively simpler process of this kind might be appropriate in some transactions, for example having a low value, but not others, for example having a higher value.

In other embodiments, instead of entering a specific voucher ID, a customer can enter a personal identifier, for example an eight-digit reference, which is associated with all vouchers, which is or are held by the customer. In other words, the identifier is associated with the customer rather than with a particular token-less transaction. In such embodiments, the voucher transaction server would have corresponding entries for customers, and, against each entry, information about one or more vouchers that are held by the customers, hi response to entering the personal identifier into the chip and PIN card reader, information relating to the voucher(s) (or lack of vouchers) may then be transmitted back to the customer, for example, via the chip and PIN card reader, and the customer may be able to select which voucher(s) to redeem for the particular transaction.

In a variant of this embodiment, if a purchase transaction relates to the purchase of a specific product, for example a certain kind of bottled beer, any voucher, which is recorded as being held by the customer, and which is suitable for use with the transaction, can be redeemed automatically, without any requirement for the customer to be presented with a list of vouchers or to select the voucher. The principle of having a personal identifier, which is associated all with vouchers held by a particular person, rather than a token-less transaction ID, associated with a product or service, does not require any significant change to the processes or hardware that have already been described. The only material change is that the VTS (or equivalent) is arranged to recognize the identifier as being associated with a person rather than with a particular voucher. The transaction request and transaction approval procedures are generally the same as have already been described. To be clear, use of personal identifiers in this way applies broadly to all kinds of token-less transactions that are mentioned herein, and are not limited only to voucher redemption.

In some embodiments, the EPOS terminal 110, which may be part of a larger iPOS system, might use the redemption authorization E) data in the sixth data packet to consolidate the transaction, for example by requesting a transfer of funds, equivalent to the value of the voucher, to the retailer from the issuer of the voucher, who may be the owner or operator of the transaction server 240. In other embodiments, the VTS 240 may institute such a transfer automatically, as soon as the transaction process 225 has confirmed the voucher redemption. In any event, many such consolidation procedures are well known, for example as used when redeeming known paper gift vouchers. In some embodiments, consolidation as such may not be required. For example, consider a scenario in which a vendor wishes to promote a new product by giving away free samples to selected people who receive a voucher to obtain the product. The people may be selected personally, by virtue of having made another purchase, for example of a book or magazine that includes a voucher, or by virtue of having participated in an event of some kind, for example a opening ceremony for a new venue, that entitles them to receive a voucher for the product. Accordingly, vouchers are issued and redeemed without any transfer or consolidation of funds. In essence, the vouchers are free at the point of issuance and at the point of redemption. However, to the recipient of the vouchers the voucher has an intrinsic value, as that person can redeem the voucher for something that they would otherwise have had to buy or forgo. Of course, in such a scenario, it would be usual for the vendor offering the promotion to pay the operator of the transaction server, who facilitates the voucher-based promotion, a service fee of some kind. However, the fee need not be in any way connected with the value of the promotional goods.

Further embodiments of the present invention relate to transactions involving the redemption of so-called loyalty points. Loyalty points schemes are widely known and used. One well-known loyalty points scheme is AirMiles™. In this scheme, a registered AirMiles user accrues mileage points, or AirMiles, whenever they fly with an airline that is affiliated with the AirMiles scheme. The AirMiles can then be redeemed in part or full payment in the purchase of another flight. The premise of the scheme is that if a customer is loyal to an affiliated airline, the customer receives a discount, proportional to the number of AirMiles accrued, off future flights. In addition, some credit card issuers are affiliated with the AirMiles scheme, whereby use of the credit card accrues AirMiles. Generally-speaking, AirMiles can only be redeemed against the cost of flights, vacations or hotels, through the AirMiles travel company. Many other loyalty schemes are known. For example, many stores issue customer loyalty cards, which accrue loyalty points as a result of purchases by the customers in the respective stores. The loyalty points accrued as a result of purchases in a specific store can then be redeemed, usually only in the same store, or store chain, against the whole or a part of a transaction.

Figure 5:
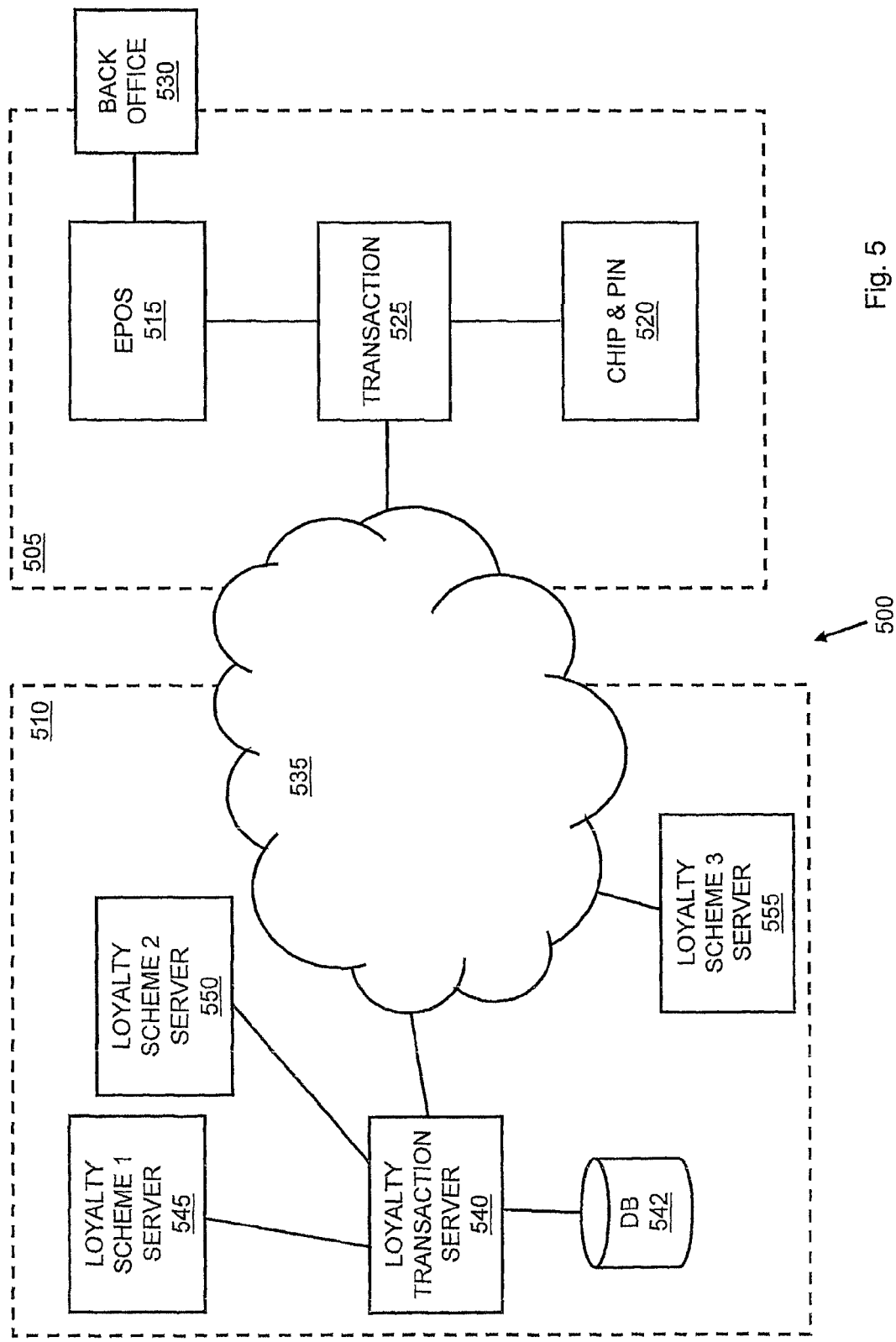
FIG. 5 is a block diagram illustrating a transaction system for redeeming loyalty points according to embodiments of the present invention.

The block diagram in FIG. 5 illustrates an alternative exemplary transaction system 500, according to further embodiments of the present invention, which relate to loyalty points redemption transactions. The transaction system 500 has a front end 505 and a back end 510, connected via a wide area network 535, such as the Internet. The back end 510 comprises one or more loyalty scheme servers 545, 550 connected via respective network connections to a loyalty transaction server (LTS) 540. The operation of the LTS 540 will be described in detail hereinafter. In some embodiments, there may in addition, or alternatively, be one or more loyalty scheme servers 555 connected, via the network 535, directly to the front end 505, as will be discussed hereinafter.

For the present purposes, the front end 505 of the transaction system 500 is substantially the same as the first mentioned front end 205, comprising three main functional blocks: an EPOS function 515, a chip and PIN card reader function 520 and a transaction function 525, for controlling an EPOS terminal 110 and a chip and PIN card reader 150. As with voucher redemption, according to the further embodiments of the present invention, it is anticipated that loyalty points may be redeemable as a direct monetary value, an indirect monetary value or as a relative monetary value.

Normally, loyalty points, which are typically collected in a loyalty points account of a customer who has an associated loyalty points card, are only redeemable against transactions enacted with (or at least in association with) the issuer of the loyalty points. For example, AirMiles can only be redeemed through the AirMiles travel company and store loyalty points are only usable in the respective stores. Embodiments of the present invention make it possible for loyalty points to be redeemed, potentially, at any store that has a chip and PIN card reader adapted as described herein, even if the store has no relationship with the loyalty points issuer. To achieve this, the LTS 540 has access to the various loyalty points issuers, whereby loyalty points can be redeemed via interactions between the LTS 540 and the respective loyalty points issuers via their servers, 545 and 550. The monetary value of particular points may be assigned by a respective loyalty points issuer in real time during a transaction or may be fixed at a pre-agreed level. The fact that the LTS 540 facilitates interactions with loyalty points issuers obviates arrangements between a store and each loyalty points provider. Thus, in principle, stores only need one arrangement with the LTS provider in order that their customers can redeem loyalty points from many different issuers. In other words, loyalty points become an alternative currency that can be used in transactions. An embodiment of the present invention involving redemption of so-called loyalty points will now be described with reference to the flow diagram in FIG. 6. In this example, a redeemer is a customer in a retail outlet who has a loyalty account associated with accrued loyalty points that can be redeemed in a transaction and the operator of a respective EPOS terminal is a retail sales assistant. The customer interacts directly with a chip and PIN card reader in order to redeem the loyalty points, as will now be described.

Figure 6:
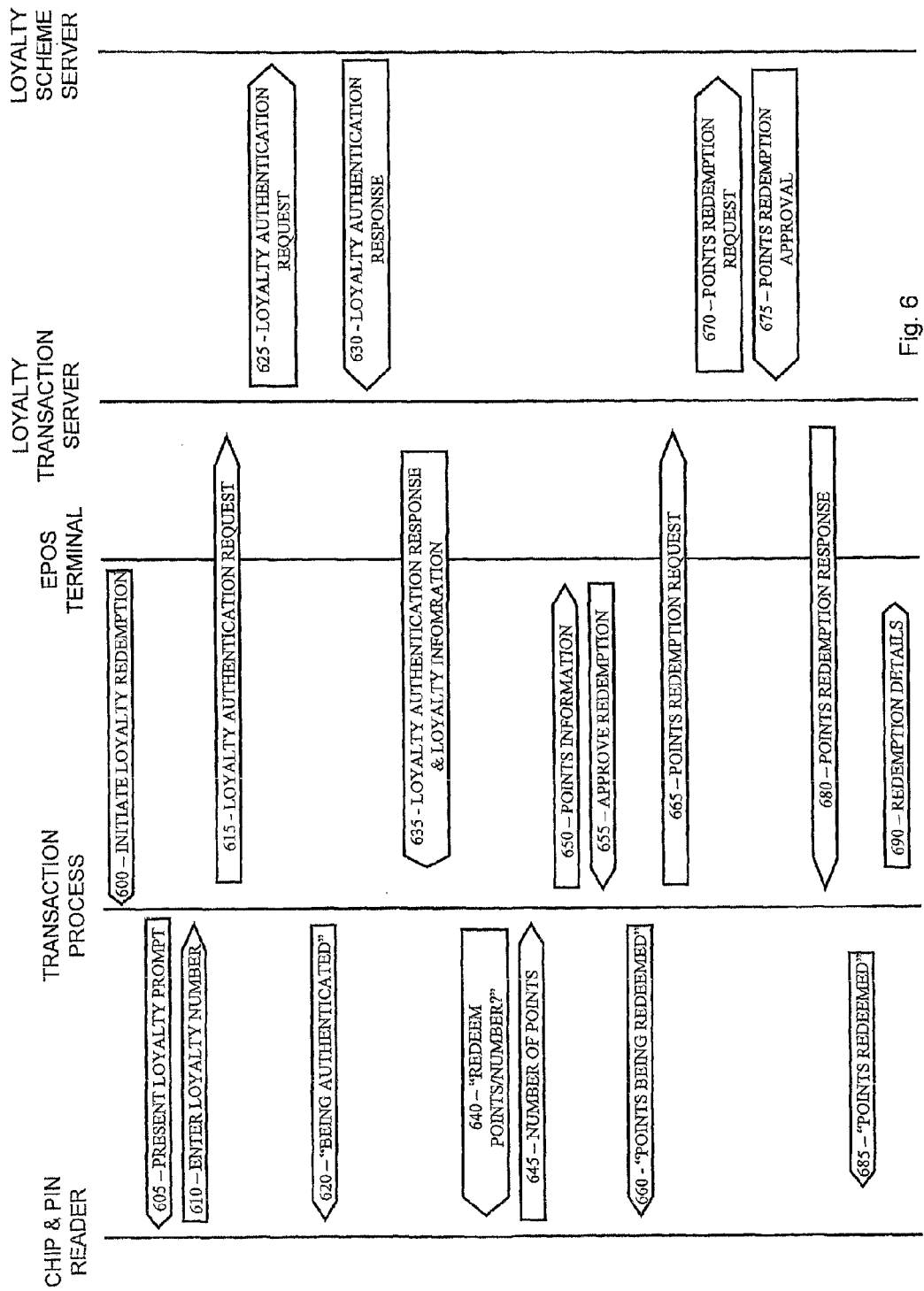
FIG. 6 is a flow diagram illustrating the steps involved in redeeming loyalty points in the system of FIG. 5.

According to FIG. 6, in a first step 600, the sales assistant initiates a loyalty points transaction by pressing a respective key 118, associated with loyalty points transactions, on the EPOS terminal 110. This causes the transaction process 525 to put the chip and PIN card reader 150 into 'loyalty points mode', whereas typically it may by default be in chip and PIN card reader mode. In step 605, the transaction process 525 causes the chip and PIN card reader 150 to present a prompt to the customer asking them to enter their loyalty points account number (or, simply, the "loyalty number"), and press "OK". In step 610, the customer enters their loyalty number using the keypad 160 on the chip and PIN card reader and presses "OK" to confirm the number. In response, in step 615, the transaction process 525 passes the loyalty number to the LTS 540. The loyalty number is transferred in a first data packet of the process. The first data packet, for example, includes the loyalty number; a transaction ID assigned to the transactions by the transaction process 525; a redemption location ID; a card reader ID; a vendor ID; and a date and time stamp. In addition, in step 620, the transaction process 525 causes the chip and PDSf card reader to display a message indicating that the details are being authenticated.

In step 625, the LTS 540 checks the loyalty number against a list of registered loyalty numbers, which are stored on the loyalty number database 542. Loyalty numbers may have been pre-registered over the telephone or by using an appropriate on-line registration system. If the loyalty number is not found then an appropriate, negative message is returned to the transaction process 525 and is passed on for display by the chip and PBSf card reader 150. If the loyalty number is found, then the LTS 540 sends an authorization request to an appropriate loyalty scheme server, in this example server 545, which is associated with the loyalty number. The authorization request includes a request for information about where the points can be redeemed and how much can be redeemed in one transaction. Each of the loyalty numbers that are stored in the loyalty database 542 will typically have stored with it an associated loyalty organization and loyalty server identity. The loyalty number is sent to the loyalty scheme sever 545 in a second data packet. The second data packet, for example, includes, the loyalty number; the transaction ID; a type of points information request, for example where the points can be redeemed and how much can be redeemed in one transaction; the redemption location ID; the card reader ID; the vendor ID; and the date and time stamp.

Next, in step 630, the loyalty scheme server 545, confirms or rejects the loyalty number as being valid or invalid. If invalid, then the server 545 indicates that the number is not known or is invalid and the message passes all the way back to the chip and PIN card reader 150 to be displayed to the customer. The number may be invalid for a number of different reasons, for example, the number may not be (or no longer be) active, an associated account may have insufficient points to redeem against the transaction or the points may not be redeemable at the location. If valid, then the server 545 authenticates the loyalty number and indicates any constraints on the redemption of the points (for example where they may be redeemed and what the maximum redemption value is). The authentication is sent to the LTS 540 in a third data packet, for example, including the loyalty number; a status (for example, "accept" or "reject"); the transaction ID; the date and time stamp; an indication of the constraints (if any) on the redemption; a maximum (and maybe minimum) limit of the redemption; the type of loyalty points/scheme; the status (for example, whether or not the points are valid and any associated reason); the description of the loyalty scheme; and a miscellaneous text field (for example, to contain any information that needs to be displayed on the card reader or EPOS terminal (e.g. "over 18 s only").

The maximum/minimum redemption points could be based either on a limit stated by the loyalty points scheme or (if this is higher than the value of the transaction) then it would be the value of the transaction. In step 635, the LTS 540 returns an authentication response, by way of a fourth data packet, to the transaction process 525. The fourth data packet, for example, includes the loyalty number; the transaction ID; an LTS transaction ID; the date and time stamp; any constraints on the loyalty points; the maximum (and maybe minimum) redemption limit; the type of loyalty points/scheme; the status (for example, whether or not the points are valid and any associated reason); the description of the loyalty scheme; and the miscellaneous text field.

In step 640, if the loyalty points are valid, the transaction process 525 causes the chip and PIN card reader 150 to display details of the loyalty scheme, how many points can be redeemed (that is the maximum limit) and the value of the points in the transaction. If the points have a monetary limit then this will also be displayed. For example, the customer may be informed that they can redeem between 10 and 500 points having a respective value of between 1 and 50 dollars.

Using the keypad 160, in step 645, the customer enters the number of points or a respective value they wish to redeem in the transaction and then confirms the number by pressing "OK". In response, the transaction process 525, in step 650, forwards the loyalty information to the sales assistant, with a request to be displayed for the sales assistant to approve the redemption in the current transaction. The loyalty information is contained in a fifth data packet, for example, including the loyalty number; the transaction ID; an LTS transaction ID; the date and time stamp; any constraints on the loyalty points; the maximum (and maybe minimum) redemption limit; the type of loyalty points/scheme; the status (for example, whether or not the points are valid and any associated reason); the description of the loyalty scheme; and the miscellaneous text field.

In step 655, the sales assistant approves the transaction by pressing the loyalty transaction key 118 again, or by some other means, for example by pressing a key (not shown) specifically assigned to approving redemption of loyalty points (and/or vouchers). In response, in step 660 the transaction process 525 causes the chip and PIN card reader to display a message that the points are being redeemed. In addition, in step 665, the transaction process 525 sends a loyalty redemption request to the LTS 540. The loyalty redemption request includes a sixth data packet, for example, including the loyalty number; the transaction ID; the LTS transaction ID; the selected value (or number of points) of the redemption; the redemption location ID; —the reader ID; the vendor ID; and the date and time stamp of the transaction.

The LTS 545 receives the loyalty redemption request and, in step 670, forwards the redemption request to the loyalty scheme server 545 by way of a seventh data packet, for example, including the loyalty number; the transaction ID; the LTS transaction ID; the selected value (or number of points) of the redemption; the redemption location ID; the reader ID; the vendor ID; and the date and time stamp of the transaction. The loyalty scheme server 545 either declines the redemption request causing an appropriate message to be passed to the transaction process 525 or, in step 675, updates its loyalty points records for the respective account using the information received in the seventh data packet and returns a redemption confirmation response to the LTS 540 in an eighth data packet, for example, including the loyalty number; the transaction ID; the LTS transaction ID; a redeemed value; a redemption confirmation indicator; —a date and time stamp of the redemption confirmation; and a number of points left.

In step 680, the LTS 540 receives the eighth data packet (storing a record of the transaction with the associated loyalty number on the loyalty ID database 542) and forwards a redemption response to the transaction process 525 by way of a ninth data packet. The response indicates that the transaction has been completed, the number of points that have been removed from the account and, optionally, the number of points remaining in the account. The ninth data packet, for example, includes the loyalty number; the transaction ID; the LTS transaction ID; the redeemed value; the redemption confirmation indicator; the date and time stamp of the redemption confirmation; and the number of points left.

In step 685, the transaction process 525 causes the chip and PIN card reader to display a message indicating that the points have been redeemed, the number of points redeemed and, optionally, the number of points remaining in the account. In addition, in step 690, the transaction process forwards the redemption details to the EPOS terminal by way of a tenth data packet so that the sales assistant can conclude the transaction, including by reducing the transaction price by the value of the redeemed loyalty points, for example by providing the customer with a receipt and obtaining any outstanding balance. The tenth data packet, for example, includes the loyalty number; the transaction ID; the LTS transaction ID; the redeemed value; the redemption confirmation indicator; and the date and time stamp of the redemption confirmation.

As with the aforementioned voucher transaction, the loyalty points transaction may need to be consolidated. This will typically occur with the retailer collecting the monetary value from the LTS provider and the LTS provider collecting the respective monetary value from the loyalty scheme provider. As with voucher redemption embodiments, loyalty points embodiments can employ many different variations in data packet and data packet content.

Other embodiments of the present invention operate to redeem loyalty points directly with loyalty points issuers, rather than by using an intermediary LTS 540. Such embodiments may find particular application if, for example, a retailer or store has an existing arrangement with a loyalty points issuer. Accordingly, interactions would then be between a loyalty points server, for example server 555, and the transaction process 525. In this case, the loyalty points server 555 operates as a transaction server, which is arranged to redeem points during interactions with the transaction process 525.

In principle, it is expected that a loyalty transaction server of the kind illustrated in FIG. 5 may find broader application than for use only with a chip and PIN card infrastructure. For example, it would be possible obtain a loyalty account number from a loyalty account card, which is swiped through a magnetic card reader attached to an EPOS terminal. Alternatively, the loyalty account number may be obtained by the sales assistant typing the number into the keyboard of an EPOS terminal. Neither of these alternative options would require the customer to enter the number into a chip and PIN card reader. In any event, the operation of the loyalty point server would remain substantially the same.

Figure 7:
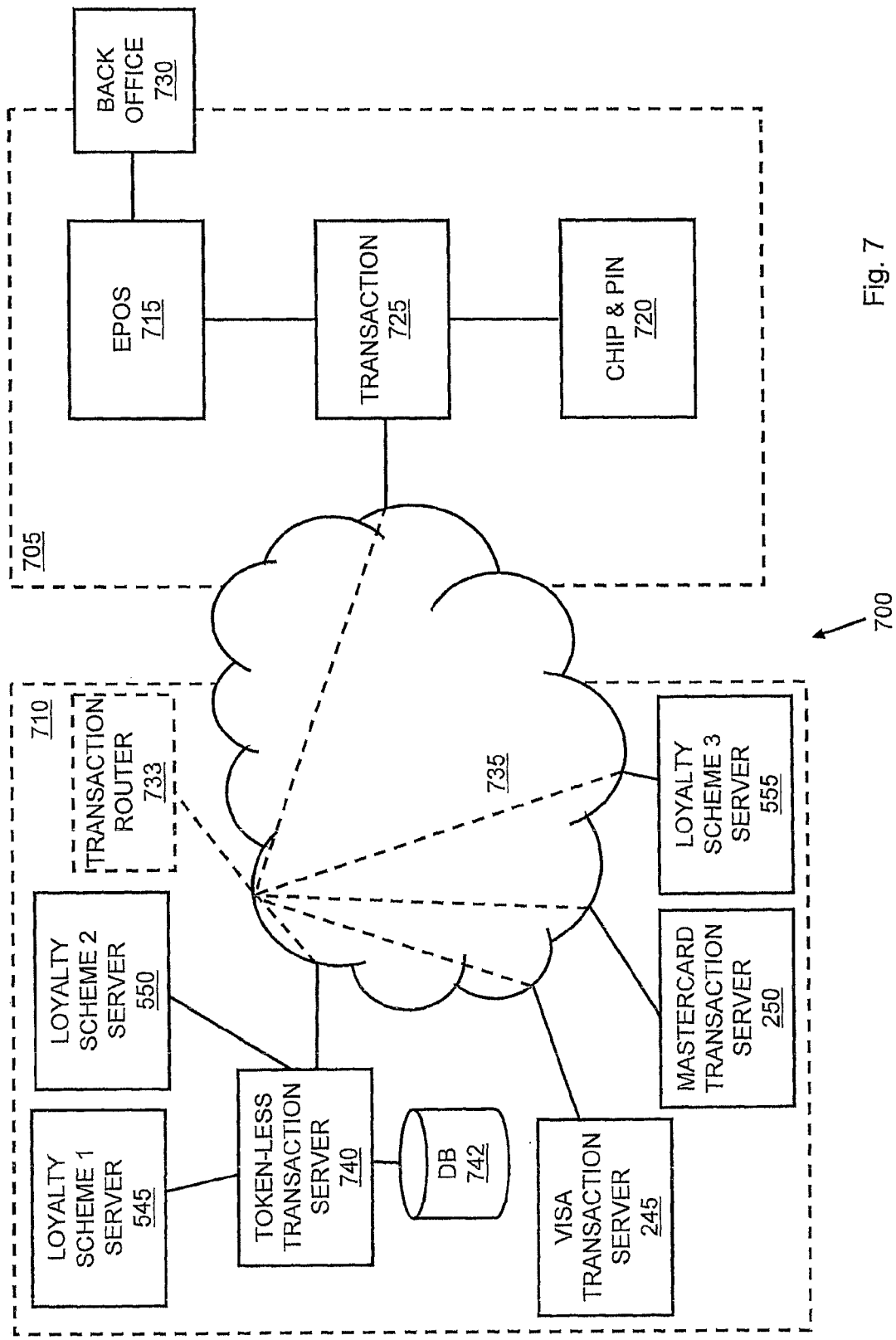
FIG. 7 is block diagram illustrating a transaction system for redeeming either or both vouchers and loyalty points.

In preferred embodiments of the present invention, chip and PIN card transactions, token-less transactions relating to voucher redemption and tokenless transactions relating to loyalty points redemption use a common transaction system infrastructure, as illustrated by way of example in the diagram in FIG. 7, which includes a customer input device, such as a keypad. As shown in FIG. 7, the system comprises front end 705 and back end 710 portions. The front end 705 comprises elements equivalent to those shown in FIGS. 2 and 5, and their function will not be described again. The back end 710, in essence, comprises the components that are equivalent to those shown in both FIGS. 2 and 5. In addition, FIG. 7 shows a token-less transaction server 740 and a token-less transaction database 742, which carry out the operations of both the voucher transaction server 240 and the loyalty transaction server 540. In effect, the addition of the token-less transaction server 740 enables the known chip and PIN card infrastructure to be used for voucher transactions, loyalty points transactions and any other kinds of token-less transaction.

In principle, it would be feasible for each chip and PIN card reader to be adapted to specifically address each data packet, which travels across the network, to its intended recipient transaction server. A more convenient approach, however, is to provide a transaction router 733, which can identity from the content or an appropriate header of each data packet, which may be added by chip and PIN card readers, which transaction server to send the data packet to. Accordingly, each chip and PIN card reader can be adapted to send all data packets to the transaction router 733 and the transaction router can route data packets accordingly, in a known way. It is expected that there are many ways of routing data packets to intended transaction servers. In principle a transaction router can be a standalone system as shown in FIG. 7 or it may be additional functionality that resides on any other system or server. For example, in some embodiments, the VISA transaction server 245 may be adapted to recognize token-less transaction data, and redirect that data to the appropriate transaction server. Then, both VISA transactions and token-less transaction requests could be sent to the VISA transaction server 245, which would forward the token-less transaction requests to the appropriate transaction server, and the responses from the transaction server would be returned back via the VISA transaction server. Of course, the routing functionality could reside anywhere in a distributed processing and networking environment. An exemplary EPOS system, of the kind illustrated in FIG. 1, comprising an EPOS terminal 110 and an independent, standalone chip and PIN card reader 150 suitable for use in accord with embodiments of the present invention will now be described in more detail with regard to the low-level block diagram of FIG. 8. The EPOS terminal 110 comprises a central processor 800, connected, via an appropriate (data and addressing) bus arrangement 802, to random access memory (RAM) 804, read only memory (ROM) 806 and an input/output (I/O) subsystem 808. The I/O subsystem 808 is connected via appropriate data leads 810 to a display 812 (or displays), a cash drawer unit 814, a keyboard 815, a back office server 816, a hard disc unit 818 and the chip and PIN card reader 150.

Many known EPOS terminals are based on a standard programmable computer platform, such as an Intel™ Pentium™ III platform, running a Windows™ operating system and having attached thereto, for example via USB ports, specific EPOS terminal components such as a cash drawer and a pole display. Such EPOS terminals operate under the control of EPOS terminal software, which is typically stored on the hard disc unit 818, and loaded into and executed from RAM 804.

As exemplified in FIG. 1, the EPOS terminal 110 may be adapted, by way of it having additional keys, 117 and 118, designated for voucher and loyalty points transactions respectively. The operation of the keys, subsequent interactions between the EPOS terminal and the chip and PIN card reader, for token-less transactions, and transaction processing involving modifying transaction values on the basis of redeeming various vouchers and/or loyalty points, are controlled by additional program logic, or functionality, operable according to embodiments of the present invention, which is added to the otherwise standard EPOS terminal software. Again, such new software can be remotely loaded.

Figure 8:
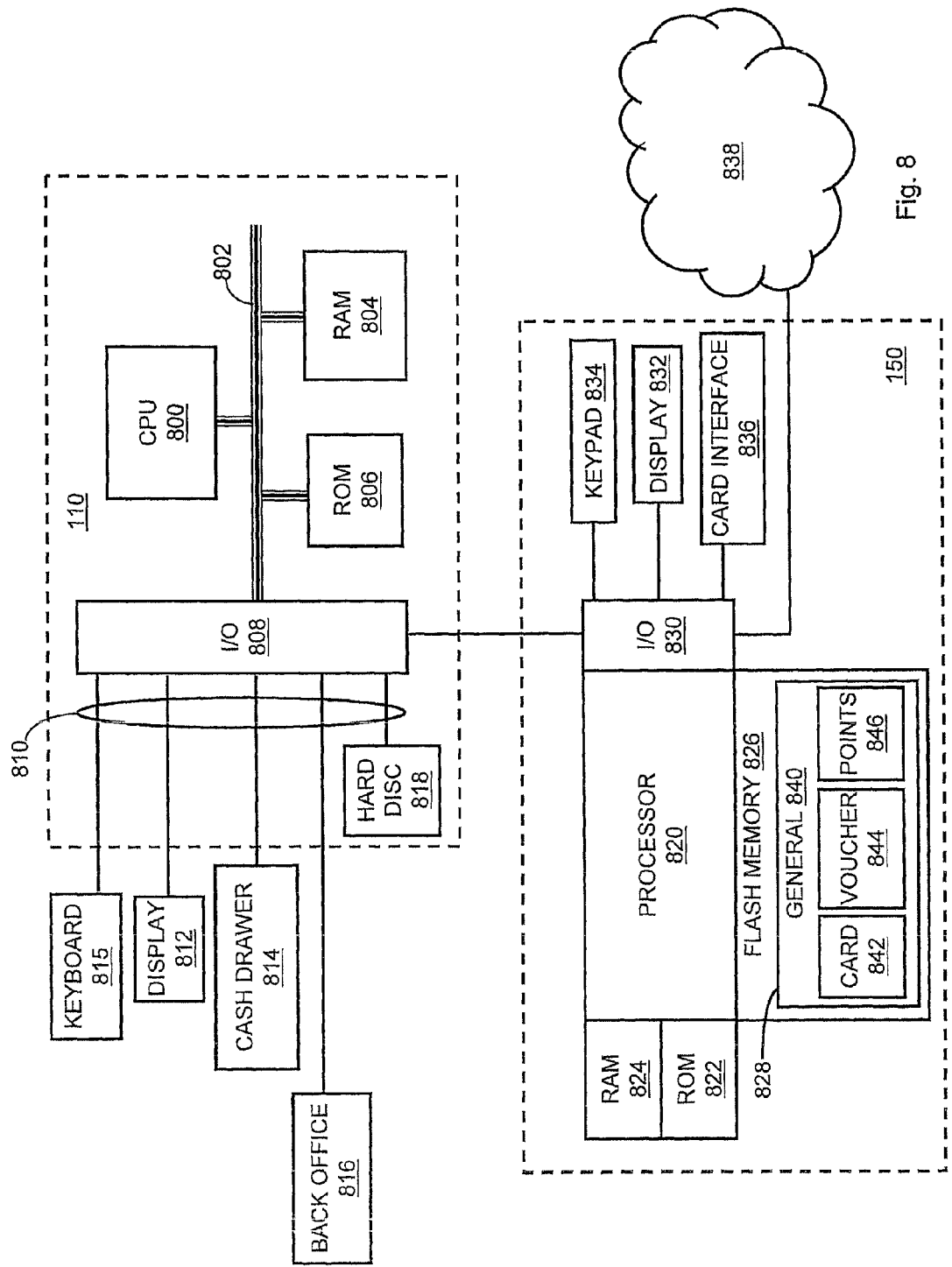
FIG. 8 is a lower level block diagram of the EPOS system of FIG. 1.

The chip and PIN card reader 150 is shown in FIG. 8 as comprising an embedded, programmed central processor 820, having ROM 822, for example, for storing equipment specific data such as reader ID, firmware update and bootstrap routines, RAM 824 for storing runtime variables or, temporarily, firmware updates, electronically re-writable memory (for example, Flash™ Memory) 826 for storing an operating program 828 for the chip and PIN card reader 150, and an I/O subsystem 830. The I/O subsystem 830 is connected to a user display 8325 a keypad 834, a card interface 836, the EPOS terminal 110 and a network 838, through which redemption transactions are enacted as has been described.

As shown, the chip and PIN card reader 150 contains an operating program 828, for example in the form of firmware, providing a general program component 840 and three specific program components 842, 844 & 846. The general program component 840 controls the overall operation of the chip and PIN card reader 150, operations that are common to each of the specific program components, for example communications with external apparatus and networks, and interactions with each of the specific program components. The first specific program component 842 controls operations of the chip and PHSf card reader that are specific to chip and PFN card operations, and is known from prior art chip and PIN card readers. The second specific program component 844 controls operations of the chip and PIN card reader that are specific to token-less voucher redemption operations according to embodiments of the present invention. The third specific program component 846 controls operations of the chip and PIN card reader that are specific to token-less loyalty points redemption operations according to other embodiments of the present invention.

A chip and PIN card reader according to embodiments of the present invention may comprise all three specific program components or just the first 842 and second 844 or the first 842 and third 846 specific program components. Typical chip and PIN card readers can be re-programmed using known firmware update routines, whereby a new control program, or components thereof, can be downloaded (for example into RAM 824) from a remote source, and internal firmware update routines (for example stored in ROM 822) can be remotely initiated to replace old firmware with replacement firmware. It is anticipated that a chip and PIN card reader of a known kind can be updated for operation according to embodiments of the present invention using such known firmware update routines to load new chip and PIN card reader firmware, whereby no new hardware components are required. Other kinds of chip and PIN card reader, for example those comprising a programmable processor controlled by software, can also be updated by using modified software.

Figure 9:
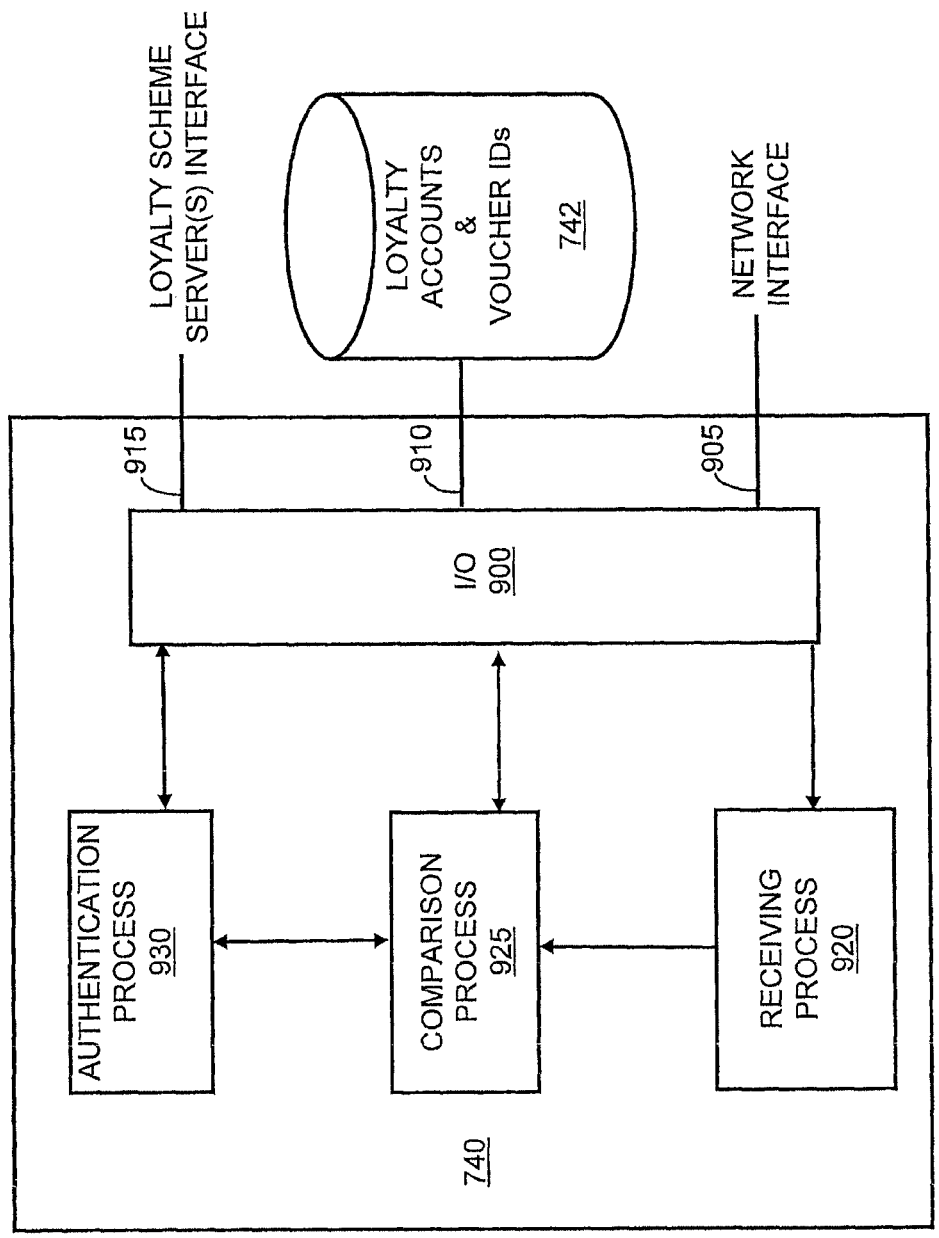
FIG. 9 is a functional block diagram of a token-less transaction server according to embodiments of the present invention.

The block diagram in FIG. 9 is a simplified functional representation of the token-less transaction server 740 of FIG. 7. As shown, the token-less transaction server comprises an interface function (I/O) 900, providing a network interface 905 for connecting to the network 735, a database interface 910 for connecting to the database 742, which forms a functional part of the transaction server, and a loyalty scheme server interface 915, which may also be a network interface. Functionally, the token-less transaction server 740 comprises a receiving process 920, a comparison process 925 and an authentication process 930, each of which operates for both voucher and loyalty point redemption transactions. In operation, the receiving process 920 receives an authentication request from a transaction process 725 via the network interface 905. The receiving process 920 forwards the authentication request to the comparison process 925. The comparison process 925 establishes whether the authentication request relates to a voucher ID or a loyalty points number. If the authentication request relates to a voucher ID then the comparison process 925 accesses the database 742 to establish if the voucher ID is valid by comparing the voucher ID with stored voucher IDs. If the voucher ID is found to be valid, by virtue of it having a corresponding entry in the database 742, the comparison process 925 obtains further associated information about the voucher from the database.

The comparison process sends the results of the search to the authentication process 930, which authenticates the authentication request and responds to the transaction process 725 via the network interface 905. If, on the other hand, the authentication request relates to a loyalty points number, the comparison process 925 first accesses the database 742 to ascertain whether the loyalty points number has been registered. If the loyalty points number has been registered, then the comparison process 925 establishes from information stored in the database 742, which is associated with the respective loyalty points number, which loyalty scheme and loyalty scheme server should be contacted for the purposes of authenticating the loyalty points transaction. Then, the comparison process 925 passes this information to the authentication process 930, which then communicates with the appropriate loyalty scheme server via the loyalty scheme server interface 915 in order to authenticate the loyalty points transaction. Once this communication is complete the resultant information is passed back to the authentication process 930, which responds to the authentication request of the transaction process 725 via the network interface 905. The processes for approving voucher and loyalty points transactions follow similar procedures to those used for authentication.

A token-less transaction server 740 can of course be implemented in many different ways. For example, the server might comprise a single computing platform running an appropriate operating system, for example Linux™, Windows™ or UNTX™, and appropriate program and database software applications. Alternatively, the token-less transaction server 740 might comprise plural computer platforms, for example arranged as a server farm, or plural distributed computer platforms, and connected via an appropriate network connection or connections. In addition, the functional components of the token-less transaction server 740 may be arranged in different ways, combined, or even distributed across plural computing platforms.

Figure 10:
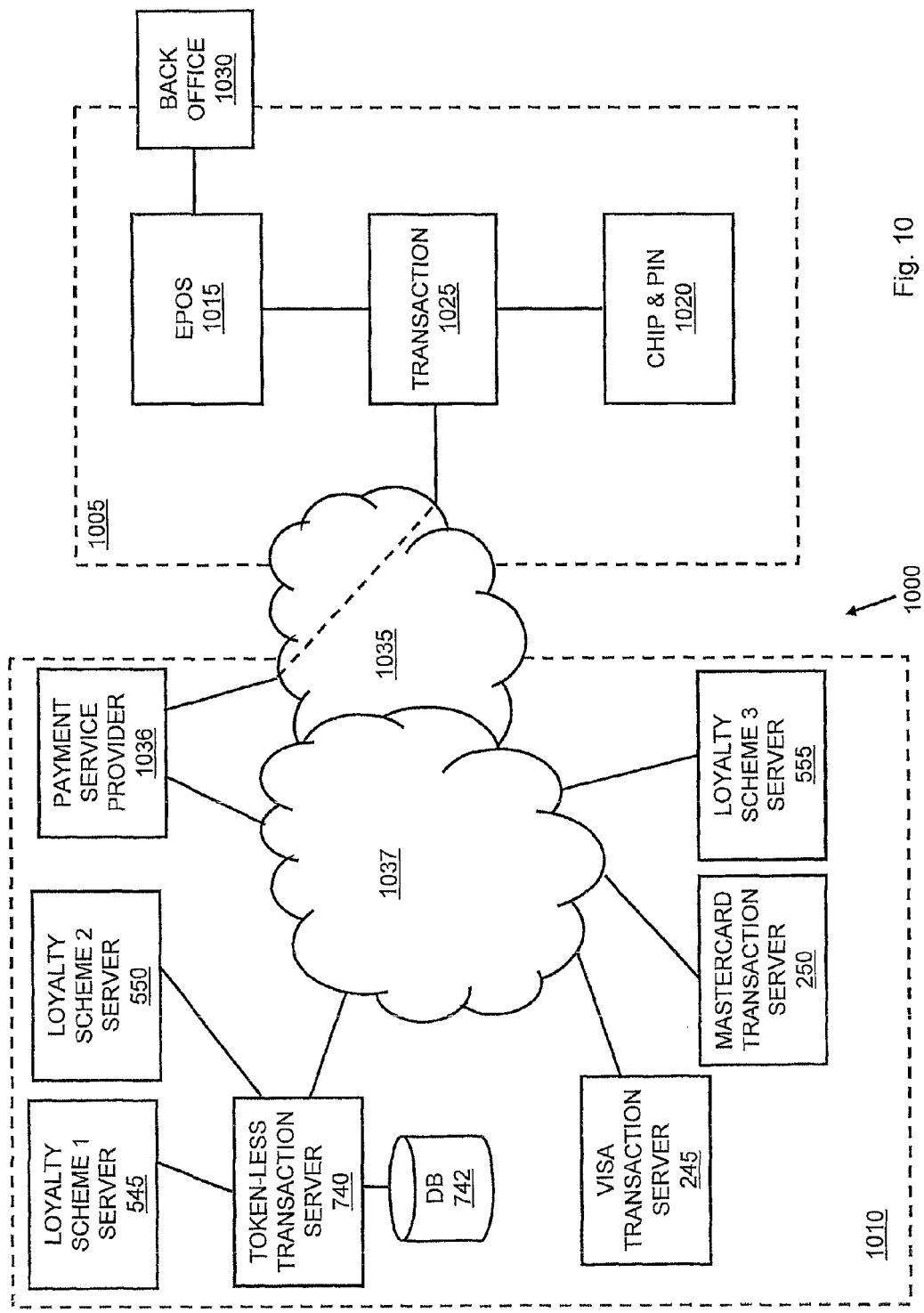
FIG. 10 is a block diagram illustrating a transaction system for redeeming either or both vouchers and loyalty points via an intermediary payment service provider system.

Hitherto, for example with reference to FIGS. 2 and 5, an exemplary transaction function 225, 525 of an EPOS system has been shown to control communications with plural transaction servers. A simplified system is illustrated in the diagram in FIG. 10, wherein a transaction function 1025 is arranged to communicate with a single server 1036. The server 1036 is owned and controlled by a payment service provider, which has relationships with various financial institutions (and their server systems) and token-less transaction institutions (and their server systems). A payment service provider behaves as a convenient, single point of contact and intermediary between, for example, retailers and financial institutions, and is able to authenticate and enact transaction requests on behalf of the retailers. Known payment service providers include WorldPay™, DataCash™ and Retail Decisions™.

According to embodiments of the present invention, the payment service provider system 1036 is adapted to recognize, and act as an intermediary for, token-less transaction requests, in addition to traditional card payment transaction requests. In this way, the payment service provider becomes an intermediary for tokenless transactions in addition to standard financial transactions. Accordingly, the retailer front end 1005 and the payment service provider 1036 communicate via a first network 1035, which may be the Internet, and the payment service provider 1036 and the various transaction servers 740, 245, 250 and 555, communicate via a second network 1037. The first network 1035 may be different from the second network 1037, or both networks may comprise a common network infrastructure, for example the Internet. An advantage of this arrangement is that the retailer front ends only need to deal with one end-point, the payment service provider 1036, and, accordingly, all kinds of transaction requests need only be routed thereto. Of course, this arrangement may be used alone or in addition to one of the other arrangements that have been described herein. For example, a retailer may use a payment service provider for some kinds of token-less transaction and some kinds of financial transactions, but another payment service provider (or providers), or one or more direct links to, other kinds of token-less transaction and other kinds of financial transactions. Other alternative arrangements may be used instead or in addition.

Embodiments of the present invention have been described in relation to various arrangements of local area networks, wide are networks and the Internet. The skilled person will appreciate that embodiments of the present invention are not in any way limited by the kind of network that is used or available to connect various parts of the system to other parts of the system. For example, the chip and PIN reader system according to embodiments of the invention may be adapted to connect directly to the various servers via a dial-up connection, using a wireless connection, via an X25 network or via any other electronic data interchange (EDI), data communications network or intermediary. Likewise, a retailer system could also connect to one or more of the various servers using a wireless connection, via an X25 network or via any other data communications network, intermediary or combination of the foregoing. Any other kind of convenient network or communications infrastructure would find utility in embodiments of the present system.

The above embodiments are to be understood as illustrative examples of the invention. Further embodiments of the invention are envisaged. For example, while redemption transactions have been described in relation specifically to vouchers and loyalty points, the principles of the invention apply equally to any kind of value that is acquired in some manner and can then be made available for redemption according to embodiments of the present invention. Likewise, aspects and embodiments of the invention are in no way limited to chip and PIN cards and card readers. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A transaction apparatus comprising:
   an input arrangement; and
   a communications interface,
   wherein, when being used for a first type of transaction, the first type of transaction comprising a token device payment transaction, the transaction apparatus is configured to receive token device information from a token device via the input arrangement, and further configured to output information via the communications interface for use in the first type of transaction, based on the on the token device information; and
   wherein, when being used for a second type of transaction, different from the first type of transaction, the second type of transaction comprising a redemption transaction, the transaction apparatus is configured to:
     receive customer data via the input arrangement;
     send, based on the received customer data, a customer identifier to a redemption transaction device; and
     receive, from the redemption transaction device, transaction information relating to a transaction entry associated with a customer identified by the customer identifier.

2. The transaction apparatus according to claim 1, wherein the redemption transaction comprises redemption in relation to one or more goods and/or services and/or redemption of a monetary value.

3. The transaction apparatus according to claim 1, wherein the customer data comprises the customer identifier.

4. The transaction apparatus according to claim 3, wherein the customer identifier comprises a loyalty number.

5. The transaction apparatus according to claim 3, wherein the transaction information comprises information indicating an amount of loyalty points.

6. The transaction apparatus according to claim 5, wherein the redemption of the one or more loyalty points is conditional on one or more predefined constraints.

7. The transaction apparatus according to claim 3, wherein, when being used for the second type of transaction, the transaction apparatus is further configured to enact a transaction on behalf of the customer, including redeeming one or more loyalty points.

8. The transaction apparatus according to claim 7, wherein the one or more predefined constraints relate to at least one of: a location of the transaction apparatus; an organisation associated with the loyalty points; and a maximum and/or minimum amount of loyalty points to be redeemed.

9. The transaction apparatus according to claim 4, further configured to:
   receive an input indicating an amount of loyalty points to be used in the transaction; and
   enact the transaction on the basis of the input.

10. The transaction apparatus according to claim 1, wherein the customer data comprises information relating to a voucher.

11. The transaction apparatus according to claim 1, wherein the customer data comprises information relating to loyalty points.

12. The transaction apparatus according to claim 9, wherein the customer identifier comprises the information relating to a voucher.

13. The transaction apparatus according to claim 1, wherein the input arrangement comprises a contact-less transceiver.

14. The transaction apparatus according to claim 1, wherein the input arrangement comprises a token device interface for receiving the token device information from the token device and a separate customer device for receiving the customer data.

15. The transaction apparatus according to claim 1, comprising a smart card reader arrangement.

16. The transaction apparatus according to claim 1, comprising a chip and PIN card reader arrangement.

17. The transaction apparatus according to claim 1, comprising an Electronic Point of Sales (EPOS) terminal.

18. The transaction system according to claim 1, wherein the transaction information relating to the one or more transaction entries indicates one or more redemption values associated with the one or more transaction entries.

19. A transaction method, comprising:
   receiving token device information from a token device via an input arrangement of a transaction apparatus;
   outputting information, via a communications interface of the transaction apparatus, for use in a first type of transaction, based on the token device information, the first type of transaction comprising a token device payment transaction;
   receiving customer data via the input arrangement for us in a second type of transaction, the second type of transaction being different from the first type of transaction and comprising a redemption transaction;
   sending, based on the received customer data, a customer identifier to a redemption transaction device; and receiving, from the redemption transaction device, transaction information relating to a transaction entry associated with a customer identified by the customer identifier.

20. A non-transitory computer-readable storage medium having computer readable instructions stored thereon, the computer-readable instructions when executed by a transaction apparatus causing the transaction apparatus to perform a transaction method, the transaction method comprising:

receiving token device information from a token device via an input arrangement of a transaction apparatus;

outputting information, via a communications interface of the transaction apparatus, for use in a first type of transaction, based on the token device information, the first type of transaction comprising a token device payment transaction;

receiving customer data via the input arrangement for us in a second type of transaction, the second type of transaction being different from the first type of transaction and comprising a redemption transaction;

sending, based on the received customer data, a customer identifier to a redemption transaction device; and receiving, from the redemption transaction device, transaction information relating to a transaction entry associated with a customer identified by the customer identifier.

* * * * *